United States Patent
Kotzin

(10) Patent No.: US 7,653,413 B2
(45) Date of Patent: Jan. 26, 2010

(54) SUBSCRIBER DEVICE AND METHOD THEREIN FOR ENHANCING INTERFACES THERETO

(75) Inventor: Michael Kotzin, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 255 days.

(21) Appl. No.: 10/184,460

(22) Filed: Jun. 28, 2002

(65) Prior Publication Data
US 2004/0204076 A1 Oct. 14, 2004

(51) Int. Cl.
*H04B 1/38* (2006.01)
(52) U.S. Cl. .................................. 455/557; 455/556.1
(58) Field of Classification Search ................. 455/418, 455/419, 420, 556–557
See application file for complete search history.

(56) References Cited

U.S. PATENT DOCUMENTS

| | | | |
|---|---|---|---|
| 6,341,316 B1 * | 1/2002 | Kloba et al. ................ | 709/248 |
| 6,532,495 B1 * | 3/2003 | Welles et al. ................ | 709/232 |
| 6,622,018 B1 * | 9/2003 | Erekson ....................... | 455/420 |
| 6,633,759 B1 * | 10/2003 | Kobayashi ................... | 455/419 |
| 6,684,087 B1 * | 1/2004 | Yu et al. ...................... | 455/566 |
| 2002/0160712 A1 * | 10/2002 | Mooney ....................... | 455/41 |
| 2003/0017846 A1 * | 1/2003 | Estevez et al. .............. | 455/556 |
| 2005/0164691 A1 * | 7/2005 | Payne .......................... | 455/419 |

* cited by examiner

*Primary Examiner*—Sam Bhattacharya
(74) *Attorney, Agent, or Firm*—Charles W. Bethards

(57) ABSTRACT

A portable subscriber device that is arranged and constructed to augment and facilitate interfaces to the device includes a wireless local area transceiver; an internal user interface; and a controller coupled to the internal user interface and the wireless local area transceiver. These elements are cooperatively operable for executing the method including: detecting an external device that is capable of providing an interface to the portable subscriber device; determining whether the external device is available as an interface to the portable subscriber device; and when available as an interface, establishing a wireless link between the portable subscriber device and the external device that will support the interface.

20 Claims, 3 Drawing Sheets

SUBSCRIBER DEVICE AND METHOD THEREIN FOR ENHANCING INTERFACES THERETO

FIELD OF THE INVENTION

This invention relates in general to device interfaces, and more specifically to a subscriber device and methods for enhancing user and other interfaces to the subscriber device.

BACKGROUND OF THE INVENTION

Subscriber devices and other personal use devices and user interfaces thereto are known. Usually these user interfaces are limited in size and capability relative to many other user interfaces. For example many cellular handsets have a display that is capable of showing only four lines and a very small keypad with a limited number of user activated keys. Similarly interfaces to, for example, a modem, if available at all are wired interfaces typically using special cables or adapter devices. The desire to have small, portable and long battery life subscriber devices has mandated, or at least led to, these limited interfaces for the subscriber devices. Clearly a need exists for a more user friendly and flexible interface for subscriber devices.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF PREFERRED EMBODIMENTS

Figure 1:
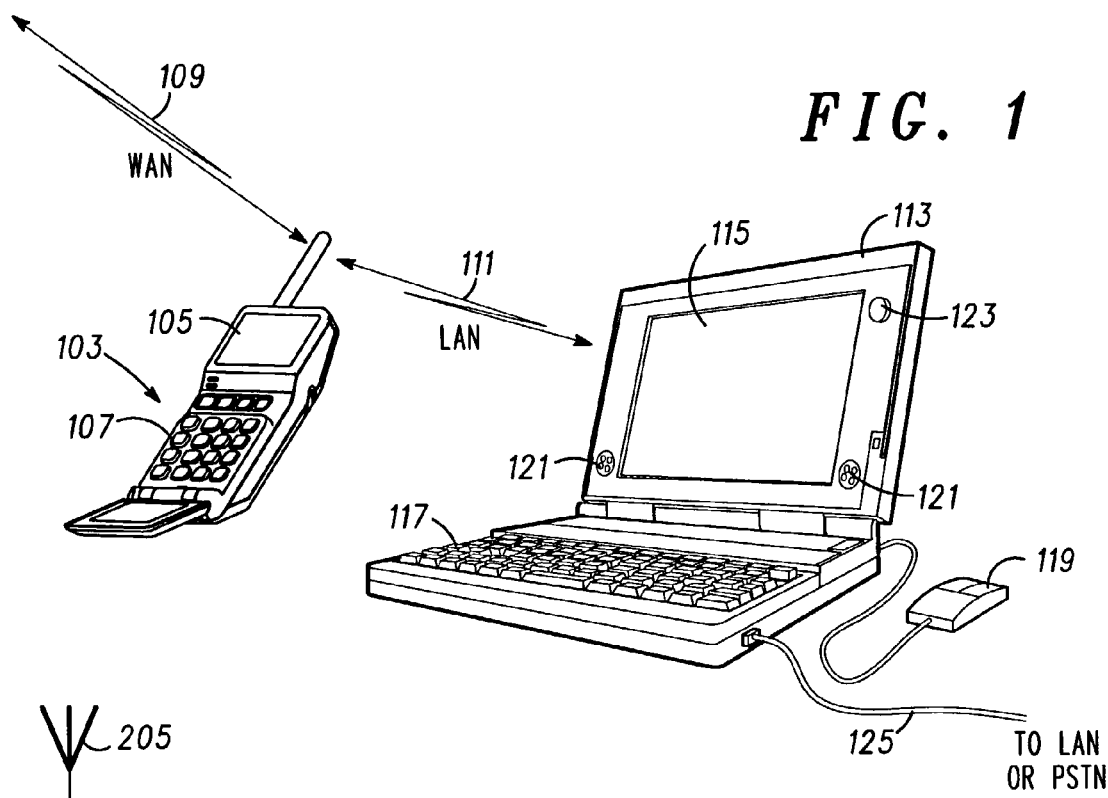
FIG. 1 depicts, in a simplified and representative form, a contextual setting for one or more interfaces to a subscriber device according to the present invention.

In overview form the present disclosure concerns communications devices or more specifically subscriber devices that provide services to users thereof. More particularly various inventive concepts and principles embodied in interfaces and methods for providing such interfaces for the convenience and advantage of the users of the devices are discussed and described. The communications equipment and devices that are of particular interest are those that are intended to be carried with the user to provide or facilitate communications services therewith, such as cellular handsets, messaging devices and so on. Devices that are always on or connected to the system such as GPRS (General Packet Radio System) devices or those that utilize SMS (Short Messaging Service) protocols or devices that are packet data enabled and that enable connectivity or sessions with IP (Internet Protocol) based networks are particularly appropriate and interesting. This would include devices arranged and constructed to operate on such systems as future packet databased systems such as $3^{rd}$ generation or UMTS (Universal Mobile Telephone Systems) systems and evolutionary versions thereof As further discussed below various inventive principles and combinations thereof are advantageously employed to provide alternative, enhanced, and expanded interfaces for a user and the user's device. The availability of these enhanced interfaces may depend, for example, on the location of the device relative to external equipment with more capable graphical user interfaces and the like. Various problems associated with known interfaces will be alleviated and a full range of features, options and applications for the subscriber device are expected to be facilitated or expanded upon, provided these principles or equivalents thereof are utilized.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued. It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

Referring to FIG. 1 a simplified and representative contextual setting for one or more interfaces to a subscriber device 103 will be discussed and described. Subscriber device 103 is depicted as a cellular or cellular like handset with a small limited internal display 105 and equally limited internal set of keys for providing to a user thereof a limited graphical user interface (GUI). The subscriber device 103 is shown in an exemplary manner as coupled to a wide area network (WAN) such as a cellular phone system such as one of the systems discussed briefly above. Also depicted is an external device or terminal such as a notebook personal computer 113 that has a large display 115 and a full QWERTY keyboard 117 and mouse 119. Additionally the external device or notebook computer is shown with audio devices, namely speakers 121 and a microphone 123 coupled thereto. Furthermore the notebook computer is depicted with a modem or network interface card (neither specifically depicted) to provide a wired interface to a local area network (LAN) or the public switched telephone network (PSTN). The external device or here notebook computer as described above is a conventional and known device. However, a wireless LAN connection 111 between the subscriber device and external device or notebook computer, purposes thereof, and the devices operation as described further herein below with reference to FIG.

Figure 3:
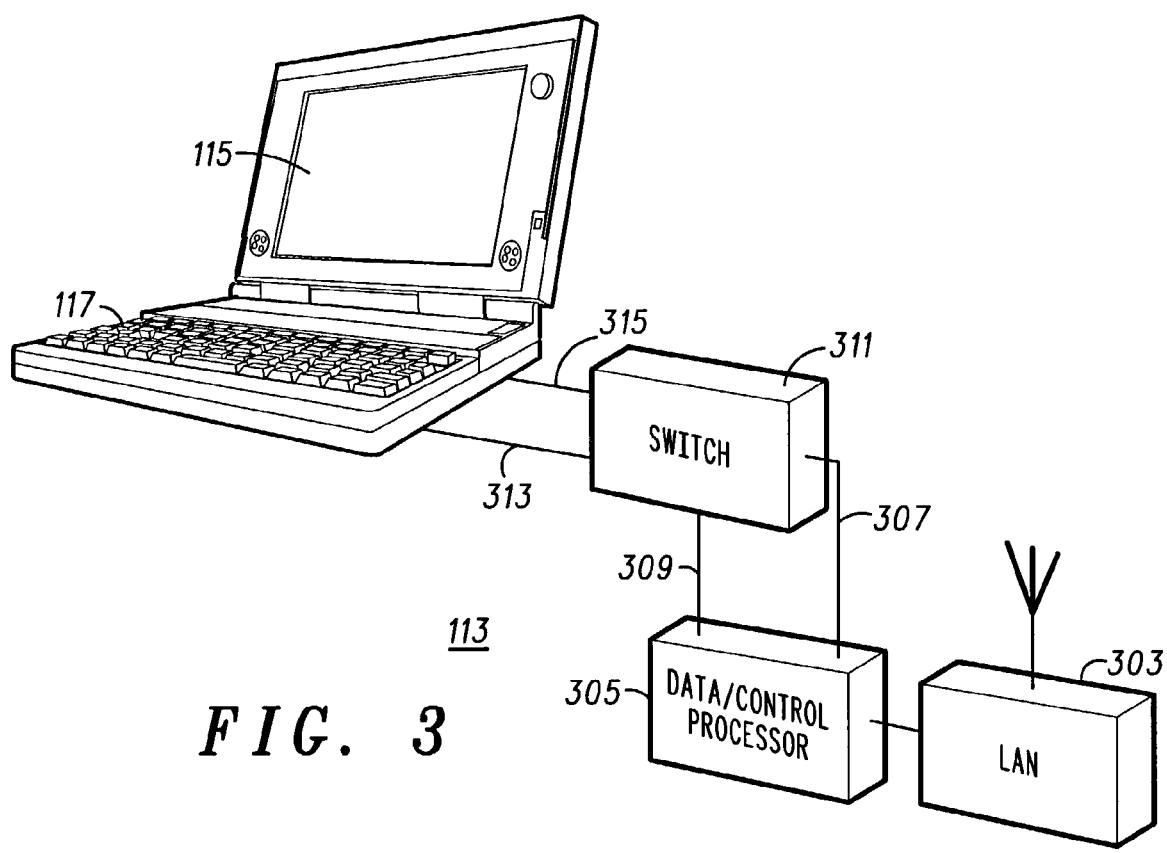
FIG. 3 shows a block diagram of an exemplary external device and an interface from the subscriber device of FIG. 2 according to the present invention.

1-FIG. 3 are inventive and advantageously provide the subscriber device with improved and enhanced interfaces.

Figure 2:
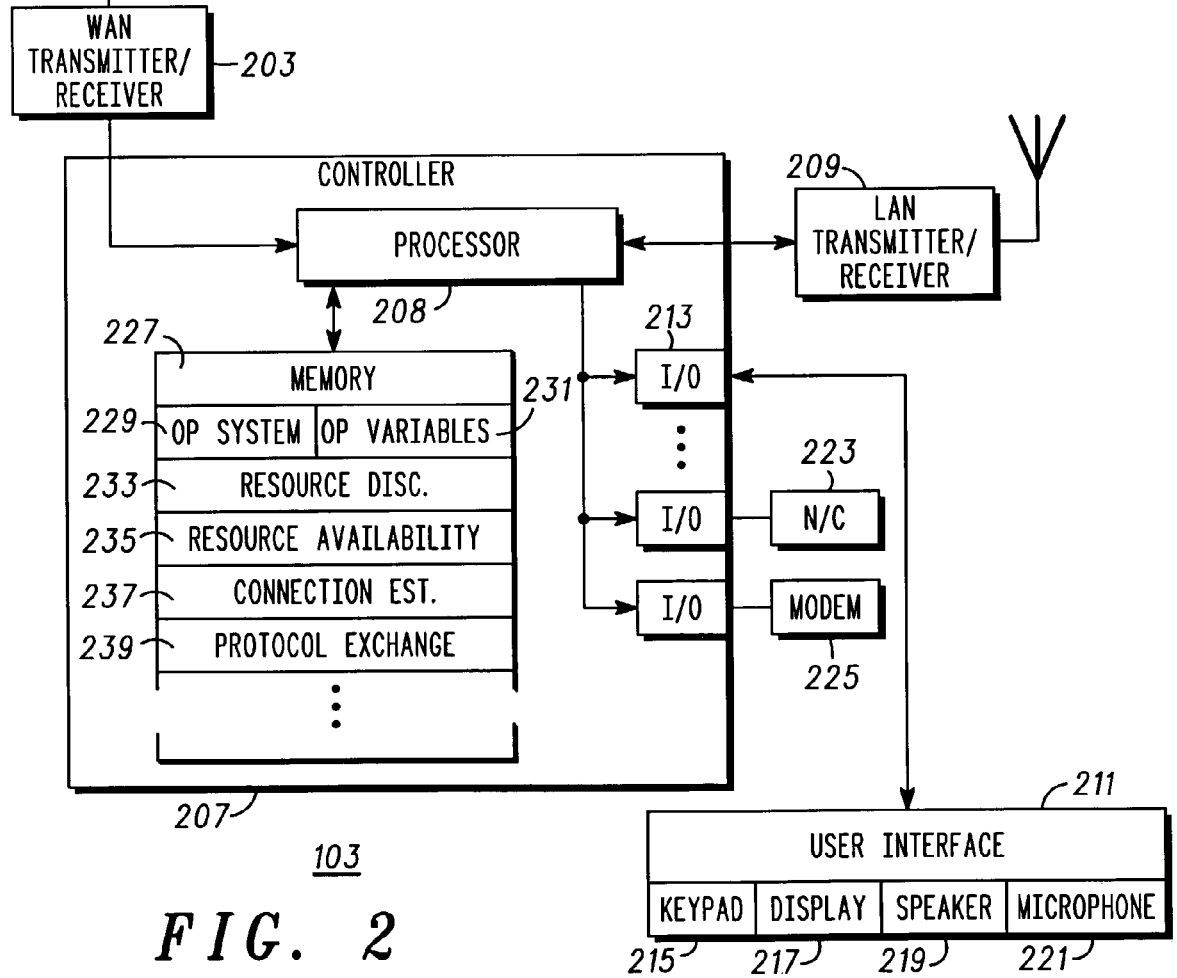
FIG. 2 depicts a block diagram of a preferred embodiment of a subscriber device according to the present invention.

Referring to FIG. 2 a block diagram of a preferred embodiment of the subscriber device 103 will be discussed and described. The portable subscriber device 103 is arranged and constructed to augment and facilitate interfacing to and from the portable subscriber device via facilities of one or more external devices. The device 103 includes the antenna 205 that operates to radiate and absorb or receive radio frequency signals that are transmitted or sent from or received by a wide area network (WAN) transceiver 203 of the subscriber device as is known. The transceiver 203 interactively operates with a controller 207 or processor 208 portion thereof to provide to or accept or receive from the controller 207, messages or signals corresponding thereto so as to interact with the WAN in order to support services, such as phone calls or data messages, for a user of the device as is also known. The controller 207 or processor 208 is coupled to and operates together with a local area or LAN transceiver 209, a user interface 211 via I/O port 213, including a keyboard 215, a display 217, a speaker 219, and a microphone 221 to effect the user interface, and optionally, via the I/O port 213, a NIC 223 or modem 225 suitable for establishing a wired interface to the portable device.

The LAN transceiver 209 is a known local area transceiver that is used to locate external devices and to establish links with appropriate such external devices. The wireless local area transceiver can be any one of an infra-red, Bluetooth, IEEE 802.11(a), IEEE 802.11(b), and Home RF technologies to name a few although Bluetooth is a preferred form. The keyboard can be a known physical keyboard or virtual keyboard that is part of the display and the display is also known and may be a liquid crystal display or the like. If the keys are part of a virtual keyboard the display will need to be touch sensitive or the like in order to convey information to the controller 207.

The controller 207 including the processor 208 that is, preferably, a known micro-processor based element that is widely available and may include one or more micro processors and one or more digital signal processors depending on the precise responsibilities of the controller with respect to signaling duties that are not here relevant. Further included in the controller as depicted is the processor 208 coupled to a memory 227 that may be a combination of known RAM, ROM, EEPROM or magnetic memory. The memory will store operating software 229 or code for the processor and various operating variables and parameters 231 as well as other items, such as messages and folders with messages, telephone number and address books, standard or canned messages, etc. (not specifically depicted). This operating software when executed by the processor will result in the processor performing the requisite functions of the subscriber device such as interfacing with the WAN and LAN transceivers 203, 209, user interface 211 and so on including others that will be further described below.

As depicted and among others the memory includes routines that represent resource discovery 233, including detecting and receiving responses from external resources, determining resource availability 235, establishing and maintaining connections 237 with external devices or resources, and exchanging appropriate protocols 239 with such devices or resources. The reader will appreciate that this listing is merely a brief listing of exemplary routines that will be required or advantageous in effecting an interface between the subscriber device and an external device and that other and various optional routines and applications that may be stored in the memory have not been mentioned.

Briefly in operation the portable subscriber device 103 will find, locate, or otherwise discover suitable external devices, establish connections therewith and route appropriate messages to and receive corresponding communications from such devices and resources either volitionally or as initiated and at the discretion of the user. When external devices and resources are being utilized the corresponding internal devices may be disabled or there operation modified to account for the external utility. Referring to FIG. 3 a block diagram of an exemplary external device 113, such as the above noted notebook computer, in one instance of an interface, specifically using the notebook computer's display 113, from or with the subscriber device will be discussed and described. The notebook computer 113 includes a LAN or local area transceiver 303 functionally identical or compatible with the LAN transceiver 209 for the subscriber device and a link has been established with the portable subscriber device.

The LAN transceiver is coupled to and perhaps controlled by a data and control processor 305. This processor 305 provides a control signal at 309 to a switch 311. The switch 311 is provided with a normal video signal at 313 and with a subscriber device video signal at 307. Once a link has been established and proper programs, protocols, and applications negotiated or exchanged between the subscriber device and the notebook computer the processor 305 will control the switch to route the appropriate video data at 315 to the video driver portion of the notebook and thus the display will show information corresponding to the subscriber device. Note this information for the subscriber device may be multiplexed with certain notebook computer information or only subscriber device video may be shown. One of ordinary skill given a specific notebook computer and subscriber device, in view of these discussions, will be competent to implement the details of these functions. Similar principles and concepts and operations would apply if the notebook computer display and mouse were also being used to interface to the subscriber device.

With reference to FIG. 2 we have described a portable subscriber device that is arranged and constructed to augment and facilitate interfacing to the device. The subscriber device includes the wireless local area transceiver 209; preferably one or more internal interfaces, such as user interface 211; and a controller 207 coupled to the internal interfaces and the wireless local area transceiver. These elements are cooperatively operable for: detecting an external device that is capable of providing an interface to the portable subscriber device; determining whether the external device is available as an interface to the portable subscriber device; and when available as an interface, establishing a wireless link between the portable subscriber device and the external device, where the link will logically and otherwise support the interface.

Detecting an external device that is capable of providing an interface to the portable subscriber device, preferably, includes performing a service discovery process and receiving, at the wireless local area transceiver 209, a response from the external device. The specifics of the discovery process and the response(s) from the external device will of course depend on the underlying technologies and protocol conventions used by the local area transceivers. Most of these technologies specify the processes, sequences, and protocols to be used for discovery procedures. These procedures and so on are available via the appropriate standards and most of those are published on web sites. For example in the preferred form where a Bluetooth local area transceiver is used, extensive specifications are available at www.bluetooth.com in the developer section under specifications. Also typically the user is left to their own to determine what applications to use and the coordination of other device specific parameters and conventions.

It will be appreciated and understood that special "device profiles" can be created to facilitate the application of this invention for use with short range wireless protocols such as Bluetooth. Additional functionality can be added to the subscriber device user interface to ease the service discovery process and help guide the user to exploit a nearby device to provide the user interface enhancement. For example, the subscriber device might detect the presence of a proximal notebook computer. The subscriber device will determine or negotiates with the external device to determine if it can be used temporarily for the subscriber device's user interface. This might be an automatic grant if, for example, the screen saver has been initiated on the notebook computer device. This screen saver activation would indicate that the notebook is available although the ability to be used as an extension or as another's I/O device would likely additionally require permission from the notebook computer's user. Of course if the subscriber device and notebook computer were under control of the same individual this would not likely be a problem.

The software on the notebook computer would be expected to ensure that a security "firewall" is provided. This would allow a wireless subscriber to use the proximal device for I/O needs or interface needs without having unauthorized access to the information normally stored on the notebook computer. Of course if the subscriber interface requirement was for extended disk space or access to certain files on the notebook computer the "firewall" would be programmed to allow such access. When the proximal device is detected and an initial negotiation is started to check availability and compatibility, the wireless device and external or proximal device would exchange messages to understand each others needs and capabilities and eventually the subscriber device would present messages to the user asking whether he wishes to exploit the I/O capability that can be afforded by the proximal device. The subscriber user could confirm the desire and a two-way wireless data link would be established and provided between the subscriber device and the notebook computer via some prearranged protocol that can be defined or determined as part of the negotiations process.

A preferred form of the protocol would be something that complies with or is derived from the "thin client" technology. In "thin client" technology, two devices are interconnected with a protocol that allows effective I/O between the devices yet can be accomplished over a limited bandwidth ("thin") link. Such "thin client" protocols and communication interfaces are known in the art. In this way, the full I/O capabilities of the notebook computer can be used in conjunction with and to support and enhance the limited I/O capabilities of the subscriber device.

Determining whether the external device is available as an interface to the portable subscriber device may be as simple as observing an idle device such as a notebook computer that the user of the portable subscriber device knows is properly equipped to support an interface and initiating the discovery process. Alternatively and in general after discovery it is anticipated that the subscriber and external device or respective controllers will exchange information or negotiate to decide or assess whether the two devices are suited or compatible at a logical and application level. For example, if the external device is a user interface device that is suitable for substituting for the user interface element and thereby improving the user interface and the portable subscriber device was seeking a substitute for the normal display such as the display on a computer monitor the subscriber device would have to be satisfied that proper video drivers were or could be made available and that proper data could be made available from the subscriber device, via the local area link, to such drivers in order to use the computer display. Furthermore an external device may not be available for certain functions as a matter of choice by the user of the external device or the tolls (costs) for using the device may not be acceptable to the portable device or user thereof and thus the external device would not be available.

When the external device is available, compatible, and so on as an interface, the controller, subject to the discretion of the user of the portable or external device, oversees and establishes a wireless link between the portable subscriber device and the external device, insuring that the link logically and otherwise supports the interface. Note that establishing the wireless link may include negotiating appropriate applications and exchanging executables and so forth in order to support the link and the intended functions of the link. It is understood that there are numerous different kinds of subscriber device I/O capabilities as well as proximal device I/O capabilities. It is likely that it will be necessary to provide some means to allow an efficient and useful mapping between these two devices. This use of some form of application program interface (API) that will provide the necessary interface to make different mappings to suit the combination of any two different devices is anticipated. One means for this to be accomplished is for one device, say the subscriber device, to obtain from the proximal device, say a notebook computer, a software definition of its I/O or interface capabilities. This information would be downloaded from the proximal or external device during the initial negotiation process. Having this I/O description, allows that subscriber device—using an internal software program—to correctly encode its I/O information for use on the proximal device.

Alternatively, the subscriber device would share its needs with the proximal device. The external or proximal device would then take the I/O data received from the subscriber device and—again using a software program but this time on the proximal device—receive the data from the subscriber and transform it so that is optimally or at least suitably arranged for use by the interface or I/O on the proximal device. It is expected that software programs will be exchanged between the subscriber device and the external device, which can be run within or executed by the other device to facilitate the proper mapping and communication of the I/O or interface information. These software programs would, preferably, be written in a platform independent language such as JAVA so that the language can be used with any subscriber or external device.

Given that portable subscriber devices are typically quite small, an interface that will be advantageous is a user interface with more extensive controls and display capability and possibly audio transducers such as speakers and microphones. For example with a typical cellular phone the display is suitable for displaying a limited version of a name and perhaps one phone number. With a link to a notebook computer display, mouse and keyboard, accessing, reviewing, maintaining, and so on a phone or address book becomes a much more user friendly experience. Instead of stepping through one user and one phone number at a time large sections of the information can be displayed and the mouse can be used to scroll through the information. This can continue even while on a phone call. Another area that may be useful for a portable subscriber device such as a messaging device or cellular handset is a link to an external device that is or that can provide access to a network interface device such as a local area network interface device or even a modem.

Even with future always connected to the network devices this additional capability can help to extend coverage, save battery life, or simply add an additional connection when needed, such as when a local network is not available through the WAN public networks.

Figure 4:
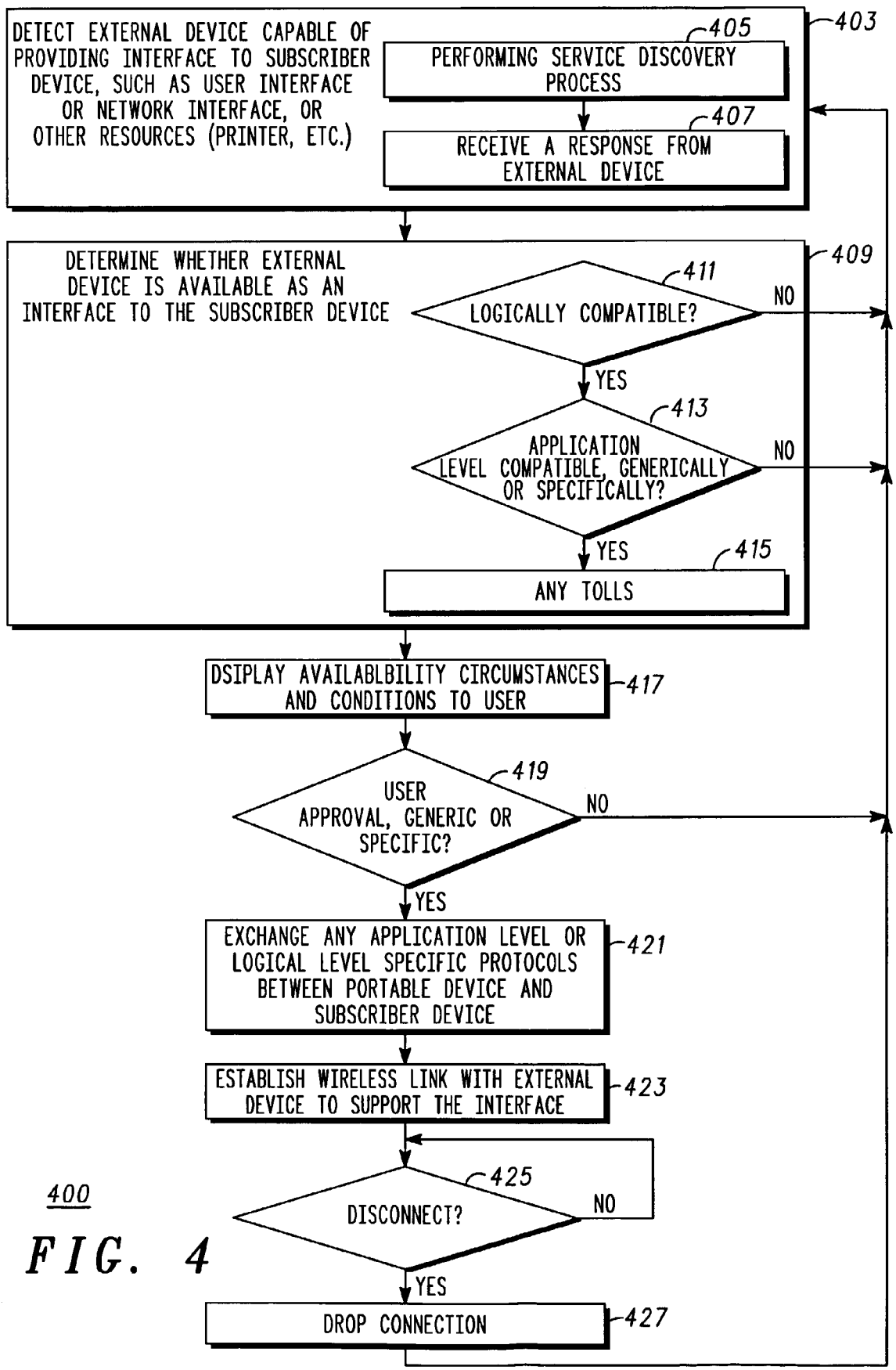
FIG. 4 depicts a flow chart of a method embodiment of providing an interface for a subscriber device according to the present invention.

Referring to FIG. 4 a flow chart of a preferred method embodiment of providing an interface that is suitable for operating the subscriber device of FIG. 2 will be described and discussed. Note this will be somewhat of a review of the above noted principles and concepts. FIG. 4 illustrates a method 400 of providing an efficient and effective interface for or to a portable subscriber device. The method begins at 403 by detecting an external device that is capable of providing an interface to the portable subscriber device, such as a user interface or network interface, or interface to other resources. These can include, for example, a display, keyboard, mouse, audio input output device, LAN or modem network interface. The detecting operation, as noted, includes preferably performing a service discovery process 405 and receiving a response from the external device 407.

Further included is determining whether the external device is available as an interface to the portable subscriber device at 409. As depicted this includes assessing logical 411 and application level compatibilities 413 between the portable subscriber device and the external device as well as whether any tolls or costs are appropriate 415. One or more of the processes at 413-415 may be initiated by or monitored and approved by the user of the portable subscriber or external device. At 417 displaying availability circumstances and conditions to the user is depicted. At 419 the user is provided an opportunity to approve a proposed interface and an indication of a generic or specific interface is suggested. If anything is incompatible at 411, 413 or if the user does not approve at 419 the method returns to 403 and the detecting process, preferably, at the users discretion.

When available as an interface, approved and so on 421 depicts the portable subscriber device exchanging any requisite logical level or application level specific protocols with the external device, where the application specific protocol facilitates an interface between the particular external device and the particular portable subscriber device. Then 423 shows establishing a wireless link between the portable subscriber device and the external device, where the link will logically support the expected interface. Whether to disconnect the link is determined at 425 and when appropriate the link for this interface is dropped at 427 and the method repeats.

Note that the link is supported as above discussed, preferably by wireless local area or local area network transceivers within the portable subscriber device and the external device. These local area transceivers are low power short range devices that depend on proximity to make and maintain a wireless connection or link. Various technologies such as infra red, Bluetooth, IEEE 802.11(a), IEEE 802.11(b), and Home RF are contemplated for the local area transceiver. The one link can support a plurality of interfaces, such as a display and keyboard for example. Thus the method 400 can be running multiple times in parallel to setup and maintain appropriate interfaces.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of providing a more effective interface to a portable subscriber device, the method including: at the portable subscriber device detecting an external device that is capable of providing an interface to the portable subscriber device, the interface further facilitating interactive user control of the portable subscriber device and displaying information at the external device corresponding to information normally displayed at the portable subscriber device;

determining whether said external device is available as an interface to the portable subscriber device; and when available as an interface, establishing a wireless link between the portable subscriber device and said external device, said link logically supporting said interface.

2. The method of claim 1 wherein said detecting an external device includes performing a service discovery process and receiving a response from the external device.

3. The method of claim 1 wherein said determining said external device is available further includes assessing logical and application level compatibilities between the portable subscriber device and the external device.

4. The method of claim 3 further including the portable subscriber device exchanging an application specific protocol with said external device, said application specific protocol facilitating an interface between said external device and the portable subscriber device.

5. The method of claim 1 wherein said external device includes one of a user interface device and a network interface device.

6. The method of claim 5 wherein said user interface device includes one of a display, keyboard, and audio input output device.

7. The method of claim 5 wherein said network interface device includes one of a modem device and local area network interface device.

8. The method of claim 1 wherein the portable subscriber device and said external device both include wireless local area transceivers.

9. The method of claim 1 wherein said wireless local area transceiver utilizes one of infrared, Bluetooth, IEEE 802.11 (a), IEEE 802.11(b), and Home RF technologies.

10. The method of claim 1 wherein said establishing said wireless link is subject to the discretion of a user of the portable subscriber device.

11. The portable subscriber device of claim 1 wherein said detecting an external device includes performing a service discovery process and receiving, at said wireless local area transceiver, a response from the external device and then exchanging an application specific protocol with said external device, said application specific protocol facilitating an interface between said external device and the portable subscriber device.

12. A portable subscriber device arranged and constructed to augment and facilitate interfacing to the portable subscriber device, the portable subscriber device comprising:

a wireless local area transceiver; and a controller coupled to said wireless local area transceiver, both cooperatively operable for:

detecting an external device that is capable of providing an interface to the portable subscriber device, the interface providing application level information between a user at the external device and the portable subscriber device;

determining whether said external device is available as an interface to the portable subscriber device; and when available as the interface, establishing a wireless link between the portable subscriber device and said external device, said link logically supporting said interface.

13. The portable subscriber device of claim 11 wherein said determining said external device is available further includes the controller assessing logical and application level compatibilities between the portable subscriber device and the external device.

14. The portable subscriber device of claim 11 wherein said external device is a user interface device that is suitable for substituting for the internal user interface element and thereby improving a user interface.

15. The portable subscriber device of claim 14 wherein said user interface device is one of a display, keyboard, and audio input output device.

16. The portable subscriber device of claim 11 wherein said external device includes a network interface device.

17. The portable subscriber device of claim 16 wherein said network interface device includes one of a modem device and local area network interface device.

18. The portable subscriber device of claim 11 wherein said external device includes another wireless local area transceiver that is compatible with said wireless local area transceiver.

19. The portable subscriber device of claim 11 wherein said establishing said wireless link is subject to the discretion of a user of the portable subscriber device.

20. A method of providing an external user interface to a portable subscriber device the method including: at the portable subscriber device detecting an external device, assessing whether that external device is capable of providing a remote user interface to facilitate user interaction with the portable subscriber device, and if not capable, exchanging an application specific protocol with said external device, said application specific protocol facilitating an interface between said external device and the portable subscriber device, the user interaction including displaying information at the external device corresponding to information displayed at the portable subscriber device; and establishing a wireless link between the portable subscriber device and said external device, said wireless link logically supporting said remote user interface.

* * * * *